(12) United States Patent
Funatsu

(10) Patent No.: US 10,750,081 B2
(45) Date of Patent: Aug. 18, 2020

(54) ELECTRONIC APPARATUS AND METHOD FOR SELECTING AN ORGAN FROM AN IMAGE

(71) Applicant: CANON KABUSHIKI KAISHA, Tokyo (JP)

(72) Inventor: Yoshihiro Funatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 16/156,753

(22) Filed: Oct. 10, 2018

(65) Prior Publication Data
US 2019/0116312 A1 Apr. 18, 2019

(30) Foreign Application Priority Data
Oct. 16, 2017 (JP) .................. 2017-200573

(51) Int. Cl.
H04N 5/222 (2006.01)
H04N 5/232 (2006.01)
G06F 3/0488 (2013.01)
G06K 9/00 (2006.01)
G06F 3/0484 (2013.01)

(52) U.S. Cl.
CPC ..... *H04N 5/23219* (2013.01); *G06F 3/04883* (2013.01); *G06K 9/00228* (2013.01); *G06K 9/00281* (2013.01); *H04N 5/23209* (2013.01); *H04N 5/23212* (2013.01); *H04N 5/232935* (2018.08); *H04N 5/232939* (2018.08); *G06F 3/04842* (2013.01)

(58) Field of Classification Search
CPC .................................................. H04N 5/23219
See application file for complete search history.

(56) References Cited

U.S. PATENT DOCUMENTS

| 8,451,246 | B1* | 5/2013 | Scholler | G06F 3/04883 345/173 |
| 8,890,993 | B2* | 11/2014 | Kunishige | H04N 5/23212 348/208.12 |
| 2011/0115940 | A1* | 5/2011 | Ojima | H04N 5/23212 348/222.1 |
| 2011/0248942 | A1* | 10/2011 | Yana | H04N 5/23212 345/173 |
| 2013/0070142 | A1* | 3/2013 | Okazawa | H04N 5/23212 348/333.01 |

(Continued)

FOREIGN PATENT DOCUMENTS

JP 2013-70164 A 4/2013

OTHER PUBLICATIONS

Wroblewski, Luke; "Touch Gesture Reference Guide"; Apr. 20, 2010; https://www.lukew.com/ all pages (Year: 2010).*

*Primary Examiner* — Gary C Vieaux
(74) *Attorney, Agent, or Firm* — Canon U.S.A., Inc., IP Division

(57) ABSTRACT

An electronic apparatus is provided for performing control, in a case where a touch is started on an area corresponding to a detected first face, and then the touch position of the touch moves in a first direction, to select a first organ area included in the first face, and, in a case where the touch is started on the area corresponding to the detected first face, and then the touch position of the touch moves not in the first direction but in a second direction, to select a second organ area included in the first face.

19 Claims, 7 Drawing Sheets

(56) References Cited

U.S. PATENT DOCUMENTS

| | | | | |
|---|---|---|---|---|
| 2014/0164963 A1* | 6/2014 | Klemenz | ............. | G06F 3/04883 |
| | | | | 715/765 |
| 2015/0264253 A1* | 9/2015 | Takagi | ............... | H04N 5/23293 |
| | | | | 348/333.11 |
| 2015/0350286 A1* | 12/2015 | Dawson | .................. | G06F 21/34 |
| | | | | 715/719 |
| 2017/0195552 A1* | 7/2017 | Saito | .................. | H04N 5/23216 |

* cited by examiner

ELECTRONIC APPARATUS AND METHOD FOR SELECTING AN ORGAN FROM AN IMAGE

BACKGROUND

Field

The present disclosure relates to an electronic apparatus and a method for controlling the electronic apparatus, and in particular to a selection of an organ area detected from an image.

Description of the Related Art

An imaging apparatus to detect organ areas such as a face and an eye (pupil), and, in response to a user operation, select any one of the detected organ areas as an automatic focusing (AF) target area, is known.

Japanese Patent Application Laid-Open No. 2013-70164 discusses a technique devised in consideration of a case where a detected pupil can be used for AF but is small-sized, and therefore the position of the pupil cannot be correctly specified by touch. In the technique discussed in Japanese Patent Application Laid-Open No. 2013-70164, the value of the sum of the size of the pupil and an offset amount are set as an area where the pupil exists.

Even with the technique discussed in Japanese Patent Application Laid-Open No. 2013-70164, a user may be unable to correctly select a desired pupil (i.e., an organ area). For example, in a case of a small-sized face, even if the offset amount is added to the size of the pupil, the boundary between both pupil areas exists or the two areas overlap at the forehead between both eyes. In this case, when the user makes an attempt to touch either eye on a screen, the user may be unable to correctly touch the target eye on the screen and a position near the forehead may be recognized as a touch position. In such a case, the pupil not intended by the user may be selected.

When selecting a facial organ by touch, the organ to be selected on the screen is hidden by the touching finger, making it hard for the user to determine whether the target organ is correctly touched on the screen. Also, in this case, the user may be unable to correctly select the target organ area.

SUMMARY

The present disclosure is directed to an electronic apparatus capable of allowing a user to more correctly select a desired organ area on a screen.

According to an embodiment, an electronic apparatus including at least one processor or circuit to perform the operations of a detection unit configured to detect a face and organ areas included in the face from an image, a touch detection unit configured to detect a touch operation on a display unit, and a control unit configured to perform control, in a case where a touch is started on an area corresponding to a first face detected by the detection unit from the image displayed on the display unit, and then a touch position of the touch moves in a first direction, to select a first organ area included in the first face, and in a case where a touch is started on an area corresponding to a first face detected by the detection unit from the image displayed on the display unit, and then the touch position of the touch moves not in the first direction but in a second direction, to select a second organ area included in the first face.

Further features will become apparent from the following description of exemplary embodiments with reference to the attached drawings.

DESCRIPTION OF THE EMBODIMENTS

An exemplary embodiment will be described in detail below with reference to the accompanying drawings.

It is to be noted that the following exemplary embodiment is merely one example and can be appropriately modified or changed depending on individual constructions and various conditions of apparatuses in which the embodiment is applied. Thus, this embodiment is in no way limited to the following description.

Figure 1A:
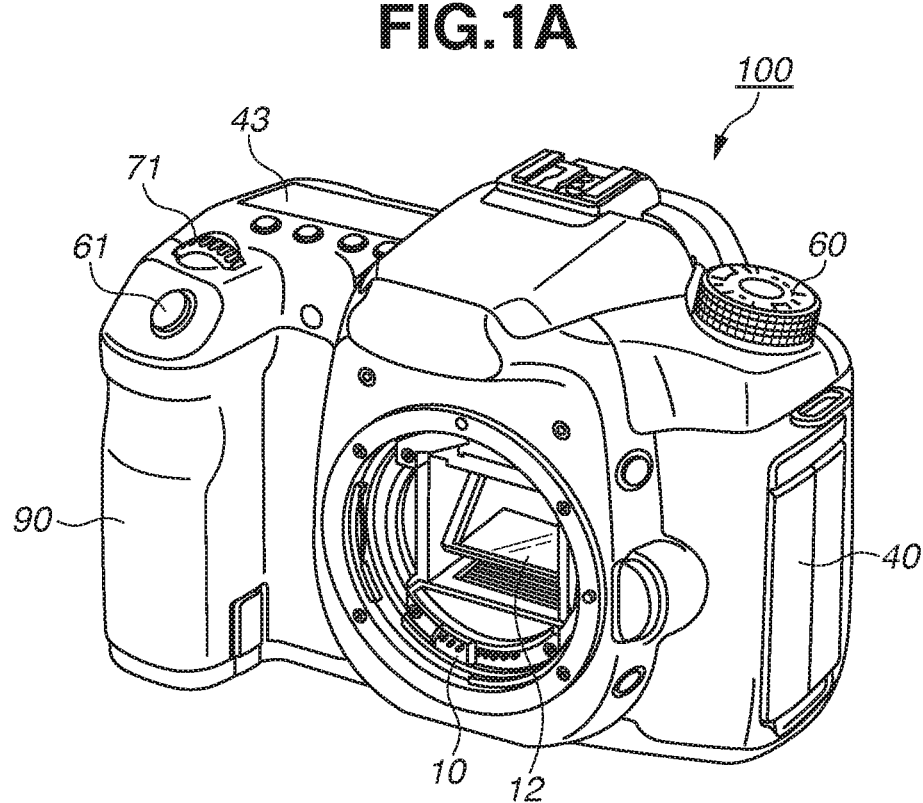
FIGS. 1A and 1B illustrate an outer appearance of a digital camera.
Figure 1B:
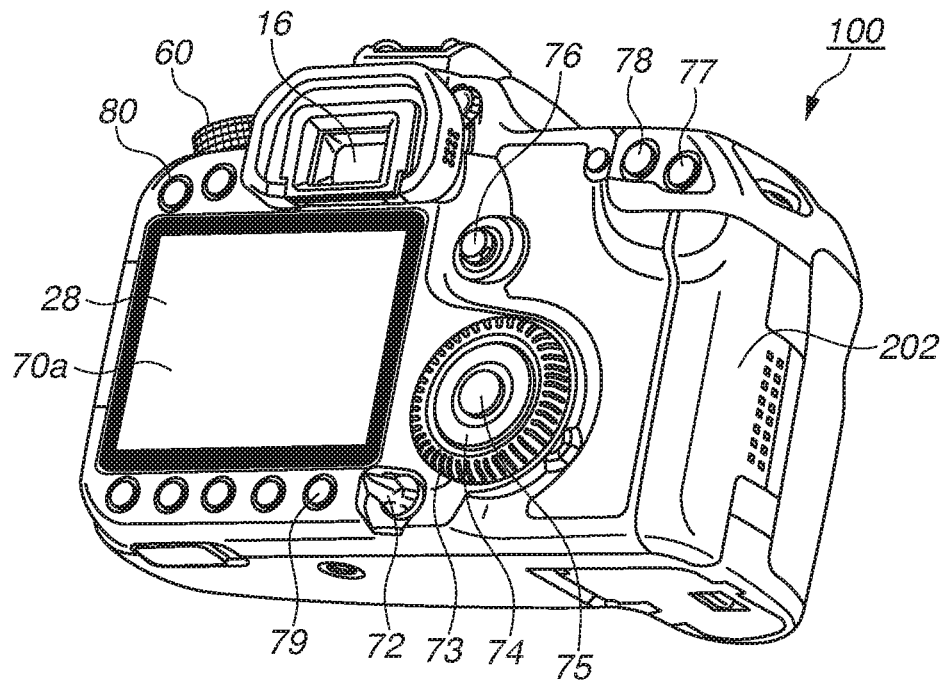

FIGS. 1A and 1B illustrate an outer appearance of a digital camera (imaging apparatus) as an example of an electronic apparatus according to an exemplary embodiment of the present invention. FIG. 1A is a perspective view illustrating a front panel of a digital camera 100, and FIG. 1B is a perspective view illustrating a back panel of the digital camera 100. Referring to FIGS. 1A and 1B, a display unit 28 disposed on the rear panel displays an image and various information. An out-finder display unit 43, which is a display unit disposed on the top face, displays the shutter speed, aperture value, and other various setting values of the digital camera 100. A shutter button 61 is an operation portion for issuing an imaging instruction. A mode selection switch 60 is an operation portion for switching between various modes. A terminal cover 40 is a cover for protecting connectors (not illustrated) for connection cables for connecting an external apparatus and the digital camera 100. A main electronic dial 71 is a rotary operation member included in an operation unit 70. Turning the main electronic dial 71 enables changing setting values such as the shutter speed value and aperture value. A power switch 72 is an operation member for turning power of the digital camera 100 ON and OFF. A sub electronic dial 73, which is a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75, which is a push button included in the operation unit 70, is mainly used to determine a selection item. A live view (LV) button 76 included in the operation unit 70 turns the live view (LV) ON and OFF in the still image capturing mode. In the moving image capturing mode, the LV button 76 is used to instruct the digital camera 100 to start and stop moving image capturing (recording). An enlargement button 77, which is an operation button included in the operation unit 70, turns the enlargement mode ON and OFF in the live view display in the imaging mode and changes the magnification in the enlargement mode. In the playback mode, the enlargement button 77 enlarges the playback image to increase the magnification. A reduction button 78 included in the operation unit 70 reduces the magnification of the enlarged playback image to reduce the displayed image. A playback button 79, which is an operation button included in the operation unit 70, switches between the imaging mode and the playback mode. When a user presses the playback button 79 in the imaging mode, the digital camera 100 enters the playback mode allowing the latest image of images recorded in a recording medium 200 to be displayed on the display unit 28. A quick return mirror 12 is moved up and down by an actuator (not illustrated) according to the instruction from the system control unit 50. A communication terminal 10 is a communication terminal of the digital camera 100 to communicate with an interchangeable lens. An eyepiece finder 16 is a look-in type finder for allowing the user to confirm the focus and composition of an optical image of a subject obtained through a lens unit 150 by observing a focusing screen 13. A cover 202 covers a slot storing the recording medium 200, A grip portion 90 is a holding portion having a shape easy to grasp with the right hand when the user holds the digital camera 100.

Figure 2:
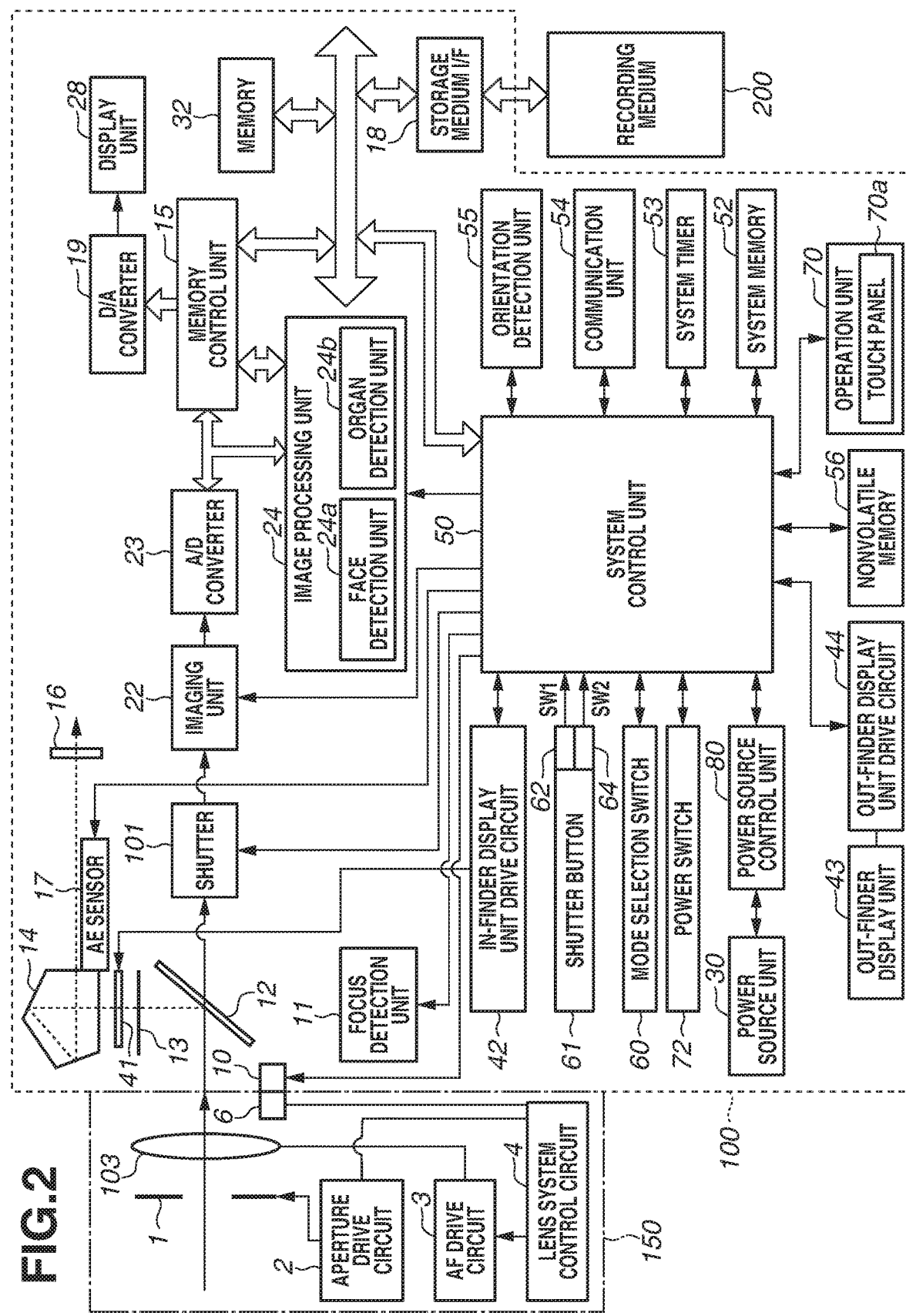
FIG. 2 is a block diagram illustrating a configuration of the digital camera.

FIG. 2 is a block diagram illustrating an example configuration of the digital camera 100 according to the present exemplary embodiment. Referring to FIG. 2, the lens unit 150 is an interchangeable lens unit including an imaging lens 103. Although the lens 103 includes a plurality of lenses, FIG. 2 illustrates only one lens to simplify the drawing. A communication terminal 6 is a communication terminal of the lens unit 150 to communicate with the digital camera 100. The communication terminal 10 is a communication terminal of the digital camera 100 to communicate with the lens unit 150. The lens unit 150 communicates with the system control unit 50 via the communication terminals 6 and 10. In the lens unit 150, a lens system control circuit 4 controls an aperture 1 via an aperture drive circuit 2 and displaces the position of the lens 103 via an automatic focusing (AF) drive circuit 3 to focus on the subject.

An automatic exposure (AE) sensor 17 measures the luminance of the subject through the lens unit 150.

A focus detection unit 11 outputs defocus amount information to the system control unit 50. The system control unit 50 controls the lens unit 150 based on the defocus amount information to perform phase difference AF.

When exposure, live view imaging, and moving image capturing are performed, the quick return mirror (hereinafter referred to as a mirror 12) is moved up and down by an actuator (not illustrated) according to the instruction of the system control unit 50. The mirror 12 switches the destination of the incident light flux incident through the lens 103 between the finder 16 and an imaging unit 22. In the normal state, the mirror 12 is disposed to reflect the light flux to guide it to the finder 16. In the imaging and live view display states, the mirror 12 pops up to guide the light flux to the imaging unit 22 and retreats from the light flux mirror up). The center portion of the mirror 12 is configured as a half mirror to transmit a part of light so that a part of the light flux is incident onto the focus detection unit 11 for performing focus detection.

By observing the focusing screen 13 via a pentaprism 14 and the finder 16, a photographer can confirm the focus and composition of an optical image of a subject obtained through the lens unit 150.

A shutter 101 is a focal plane shutter capable of freely controlling the exposure time of the imaging unit 22 according to the control of the system control unit 50.

The imaging unit 22 is an image sensor configured of a charge coupled device (CCD) sensor or complementary metal oxide semiconductor (CMOS) sensor for converting an optical image into an electric signal. An analog-to-digital (A/D) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the AD converter 23 or data from the memory control unit 15. The image processing unit 24 performs predetermined calculation processing by using captured image data. The system control unit 50 performs exposure control and ranging control based on the obtained calculation result. This enables performing the AF processing, AE processing, and Electronic Flash Preliminary Emission processing (hereinafter, referred to as an EF processing) based on the Through-The-Lens (TTL) method. The image processing unit 24 performs predetermined calculation processing using captured image data and also performs TTL-based automatic white balance (AWB) processing based on the obtained calculation result.

Output data from the A/D converter 23 is written in the memory 32 via the image processing unit 24 and the memory control unit 15 or directly written in the memory 32 via the memory control unit 15. The memory 32 stores image data captured by the imaging unit and converted into digital data by the A/D converter 23 and stores image data to be displayed on the display unit 28. The memory 32 is provided with a sufficient storage capacity for storing a predetermined number of still images, and moving images and sound for a predetermined time period.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed by the display unit 28 via the D/A converter 19. The display unit 28 displays an image corresponding to the analog signal from the D/A converter 19 on a display unit such as a liquid crystal display (LCD). The digital signal generated through A/D conversion by the A/D converter 23 and stored in the memory 32 is then converted into an analog signal by the D/A converter 19. Successively transmitting images to the display unit 28 to display images thereon allows the display unit 28 to function as an electronic view finder capable of live view display.

A frame (AF frame) indicating the focusing point at which AF is currently being performed and icons indicating the setting conditions of the digital camera 100 are displayed on an in-finder LCD unit 41 via an in-finder display unit drive circuit 42.

Various setting values of the digital camera 100 such as a shutter speed value, an aperture value are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operating the system control unit 50 are stored in the nonvolatile memory 56. Programs stored in the nonvolatile memory 56 refer to programs for executing various flowcharts (described below) according to the present exemplary embodiment.

The system control unit 50 is at least one processor or circuit for controlling the entire digital camera 100. Each piece of processing according to the present exemplary embodiment (described below) is implemented when the system control unit 50 executes the above-described programs recorded in the nonvolatile memory 56. A system memory 52 is a random access memory (RAM). Constants and variables for operating the system control unit 50 and programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various controls and measuring time for a built-in clock.

The mode selection switch 60, the shutter button 61, the operation unit 70, and the power switch 72 are operation units for inputting various operation instructions to the system control unit 50. The mode selection switch 60 switches the operation mode of the system control unit 50 between the still image recording mode, the moving image capturing mode, and the playback mode. Modes included in the still image recording mode include the auto imaging mode, auto scene determination mode, manual mode, aperture value priority mode (Av mode), and shutter speed priority mode (Tv mode). The digital camera 100 is also provided with various scene modes as imaging settings for each captured scene, the programmed AE mode, and the custom mode. The mode selection switch 60 allows the user to directly select one of these modes. Alternatively, after once selecting an imaging mode list screen using the mode selection switch 60, the user may select either one of a plurality of displayed modes using other operation members. Similarly, a plurality of modes may also be included in the moving image capturing mode.

The first shutter switch 62 turns ON in the middle of depression (half-depression) of the shutter button 61 provided on the digital camera 100 to generate a first shutter switch signal SW1 (imaging preparation instruction). The first shutter switch signal SW1 causes the system control unit 50 to start operations including the AF processing, AE processing, AWB processing, and EF processing.

A second shutter switch 64 turns ON upon completion of depression (full-depression) of the shutter button 61 to generate a second shutter switch signal SW2 (imaging instruction operation). In response to the second shutter switch signal SW2, the system control unit 50 starts a series of imaging operations ranging from signal reading from the imaging unit 22 to image writing (as an image file) in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image feeding button, jump button, aperture stopping-down button, and attribute change button. For example, when a menu button is pressed, a menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as input members for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79.

A power source control unit 80 including a battery detection circuit, a direct-current to direct-current (DC-DC) converter, and a switch circuit for selecting a block to be supplied with power detects the presence or absence of a battery, the batten type, and the remaining battery capacity. The power source control unit 80 also controls the DC-DC converter based on the detection result and an instruction from the system control unit 50 to supply required voltages to the recording medium 200 and other components for required time periods.

A face detection unit 24a is at least one processor or circuit for detecting specific areas such as person's faces from an image obtained by the image processing unit 24. An organ detection unit 24b is at least one processor or circuit for detecting organ areas from an image obtained by the image processing unit 24 and specific areas detected by the face detection unit 24a. Organs refer to pupils, nose, mouth, and other facial components. In the present imaging apparatus, both the face detection unit 24a and the organ detection unit 24b (a unit for detecting elements of specific areas detected by the face detection unit 24a) are parts of the image processing units 24. More specifically, the face detection unit 24a and the organ detection unit 24b may be an identical processor, circuit, or module having functions of both units, or may be different processors, circuits, or modules.

A power source unit 30 includes a primary battery such as an alkaline battery and lithium battery, a secondary battery such as a NiCd battery, NiMH battery, and Li battery, and an alternating current (AC) adaptor. A recording medium interface (I/F) 18 is an interface to the recording medium 200 such as a memory card and hard disk. The recording medium 200 is, for example, a memory card for recording captured images, including a semiconductor memory or magnetic disk.

A communication unit 54 wirelessly or wiredly establishes connection to perform transmission and reception of image and audio signals. The communication unit 54 is also connectable with a wireless Local Area Network (LAN) and the Internet. The communication unit 54 can transmit images (including the live view image) captured by the imaging unit 22 and images recorded in the recording medium 200, and can receive image data and other various information from an external apparatus.

An orientation detection unit 55 detects the orientation of the digital camera 100 relative to the gravity direction. Based on the orientation detected by the orientation detection unit 55, the system control unit 50 can determine whether the image captured by the imaging unit 22 is an image captured with digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or gyroscope sensor can be used as the orientation detection unit 55.

As one of the operation unit 70, the digital camera 100 is provided with the touch panel 70a capable of detecting a touch on the display unit 28. The touch panel 70a and the display unit 28 can be integrally formed. For example, the touch panel 70a is configured in such a manner that the light transmissivity of the touch panel 70a does not disturb the display of the display unit 28 and is attached to the upper layer of the display surface of the display unit 28. Then, the input coordinates on the touch panel 79a are associated with the display coordinates on the display unit 28. This enables configuring such a graphical user interface (GUI) that virtually allows the user to directly operate the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to remove the finger or pen in contact with the touch panel 70a, from the touch panel 70a to end touching (hereinafter referred to as a "touch-up")

A state where the linger or pen is not in contact with the touch panel 70a (hereinafter referred to as a "touch-off")

When a touch-down is detected, a touch-on is also detected at the same time. After a touch-down, a touch-on is normally kept being detected until a touch-up is detected. A touch-move is detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of operation (touch operation) has been performed on the touch panel 70a. For a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation (drag) has been performed.

An operation to quickly move the finger over a certain distance while in contact with the touch panel 70a and then release the finger therefrom is referred to as a flick. In other words, a flick is an operation to quickly flip the surface of the touch panel 70a with the finger. When a touch-move at a predetermined speed or higher over a predetermined distance or longer is detected and then a touch-up is subsequently detected, it can be determined that a flick has been performed (a flick has been performed following a slide).

A touch operation to simultaneously touch a plurality of positions (e.g., two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch").

The touch panel 70a may be of any one of various types of touch panel including resistance film type, capacitance type, surface elastic wave type, infrared type, electromagnetic induction type, image recognition type, and optical sensor type. Although a touch is detected when the finger or pen comes in contact with the touch panel 70a or when the finger or pen comes close to the touch panel 70a depending on the type, either type is applicable.

The digital camera 100 allows the user to set one of a plurality of AF modes as an AF operation mode at the time of imaging according to a user operation. AF mode setting is performed based on a user operation in an AF mode setting screen displayed when a menu item for AF mode setting is selected in the setting menu screen. A plurality of AF modes is provided for each method for determining an AF target position. According to the present exemplary embodiment, a one-point AF mode or tracking priority mode is set as an AF mode.

The one-point AF mode is an AF mode in which the AF frame indicating a focus adjustment position is set at e center of the imaging range or set to one point specified by the user. In the one-point AF mode, the AF frame does not move even if the subject changes, and AF is performed based on information (the contrast value and the defocus amount for phase difference AF) acquired from the AF frame position regardless of whether the subject such as a face has been detected.

In the tracking priority mode, when tracking is not specified by the user (tracking standby state or tracking release state), the subject determined to be the main subject by the digital camera 100 automatically becomes the AF target (focus adjustment position). When a person's face is detected, the digital camera 100 preferentially determines the detected person's pupil or face as a main subject and sets the main subject as an AF target. When no person's face is detected, the digital camera 100 automatically determines the main subject according to a predetermined condition such as a moving object, a subject having a high contrast value, and a subject near the center and sets the main subject as an AF target. After tracking is specified by the user, the digital camera 100 keeps tracking the subject specified in the LV image and sets the subject currently being tracked as an AF target. For example, when the user specifies tracking a pupil or face of a person A (tracking in progress), the digital camera 100 keeps tracking the pupil or face of the person A even if the person A moves in the LV image and sets the pupil or face as an AF target.

An object other than a person can also be a tracking target (object tracking). The digital camera 100 keeps tracking the same subject under certain conditions e.g., color of the position with tracking specification, contrast, shape) even if it moves in the IN image, and sets the subject as an AF target. More specifically, the tracking priority mode is an AF mode in which the AF position can be determined through tracking. The AF modes are not limited to the one-point AF mode and the tracking mode. For example, the digital camera 100 may have an AF mode in which tracking is performed in a limited area specified by the user ("zone AF"). The set AF modes are stored in the nonvolatile memory 56 and are loaded into the system memory 52 in the imaging mode processing.

Face detection and organ detection will be described below with reference to FIGS. 3A and 3B.

Figure 3A:
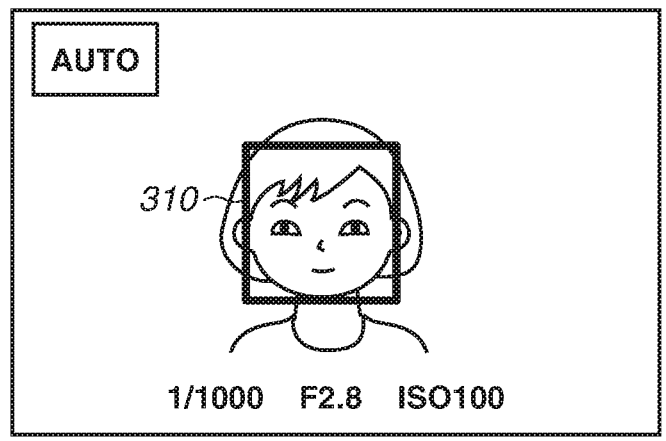
FIGS. 3A and 3B illustrate examples of frames displayed when a face and organs are selected.

FIG. 3A illustrates an example of an image displayed on the display unit 28. More specifically, in a state where an image captured by the imaging unit 22 or an image recorded in the recording medium 200 is played back, the face detection unit 24a detects a face area from the image and superimposes a face frame 301 indicating the detected face area onto the image. The face detection unit 24a detects a person's face from the image. In this case, the face detection unit 24a can determine the size and orientation of the face. Based on these pieces of information, the user can specify (select) a face area as a main subject to be an AF target or as a subject to be a color correction target through a touch operation on the touch panel 70a.

Figure 3B:
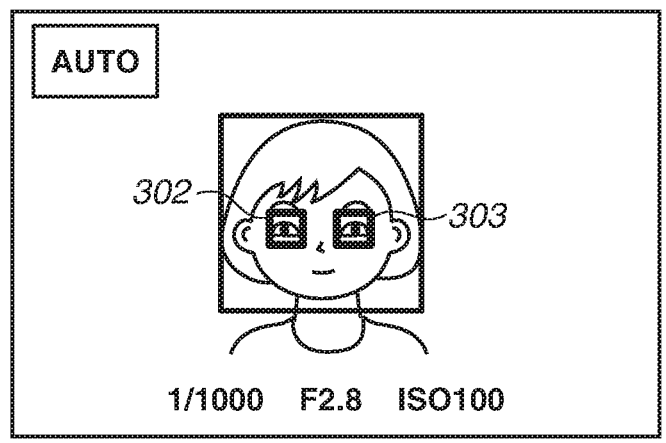

FIG. 3B illustrates examples of organ frames 302 and 303. More specifically, in a state where an image captured by the imaging unit 22 or an image recorded in the recording medium 200 is played back, the face detection unit 24a and the organ detection unit 24b detect a face and organs from the image and superimpose the organ frames 302 and 303 indicating the detected facial organ areas onto the image. The organ frame 302 is an index indicating the area of the left side pupil toward the screen. The organ frame 303 is an index indicating the area of the right side pupil toward the screen. Also, in organ detection, the user can determine the size and orientation of an organ and specify (select) a detected organ area through a touch operation.

When the face detection unit 24a and the organ detection unit 24b detect a face, facial organs, for example, the right and left eyes, area specification may be possibly performed based only on the touch position at a touch-down or touch-up, i.e., the face area, the left eye area, or the right eye area. A face area refers to an area that is neither the left eye area nor the right eye area out of the face area. However, if processing is performed in this way, the user may be unable to specify an area as intended by the user. In a possible example case, although the user thinks that the user has touched the inside of the right eye area intending to specify the right eye area, the user has actually touched the outside of the right eye area and therefore the entire face or the left eye is specified. This problem is more remarkable in a case where the detected face or organ is small-sized or where the subject's position and size change in the entire image as in the LV or a moving image. Possible causes that the user fails to suitably specify the intended area include the difficulty in confirming whether the intended position is suitably touched because the specification target is hidden by the finger when specifying a small target such as a pupil or face. To solve this problem, the present exemplary embodiment allows the user to more reliably specify the area intended by the user by using not only the touch position of a touch-down or touch-up but also the movement of the touch position (touch-move).

Figure 4:
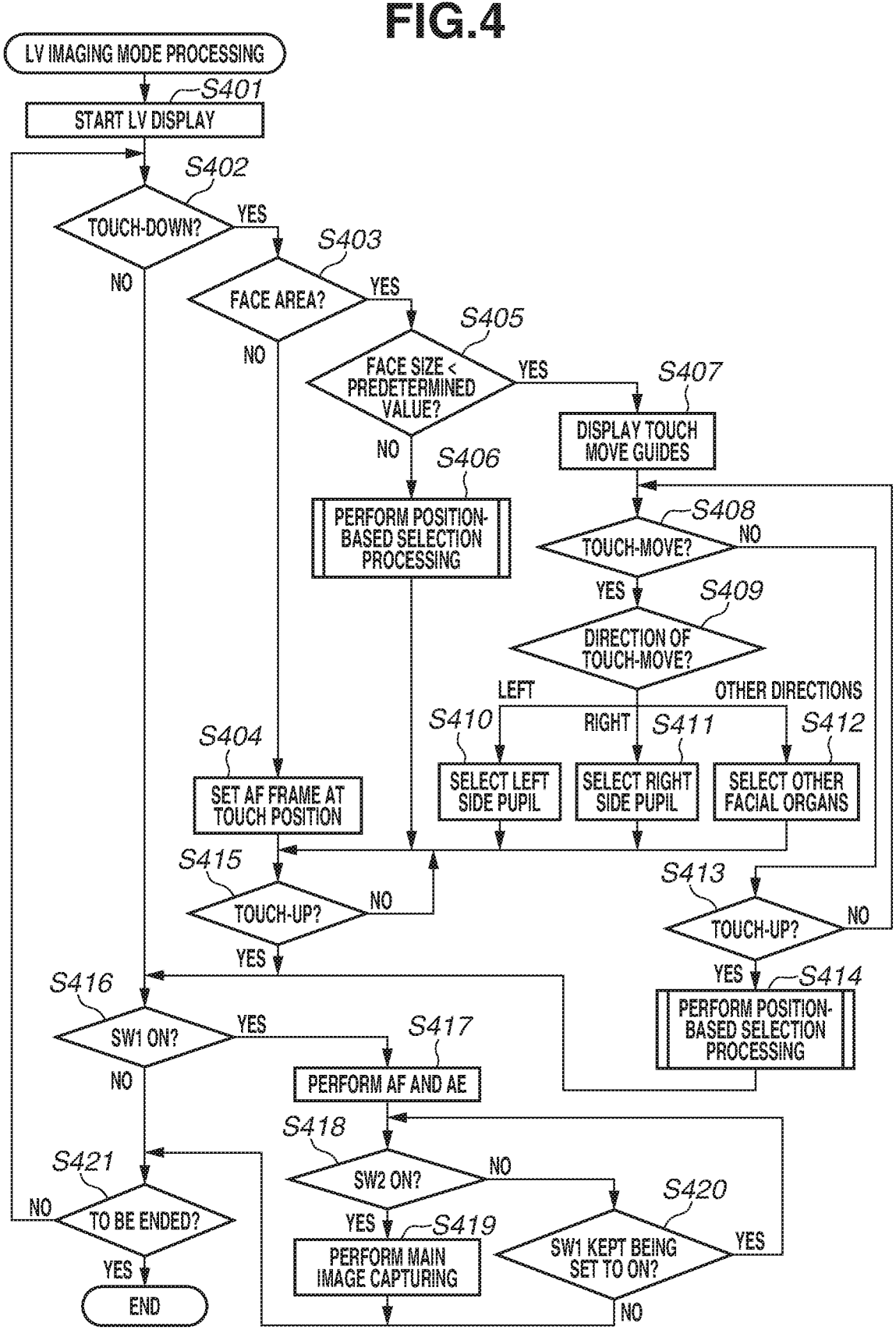
FIG. 4 is a flowchart illustrating live view (IN) imaging mode processing.

FIG. 4 is a flowchart illustrating the live view (LV) imaging mode of the digital camera 100. This processing is implemented when the system control unit 50 loads a program recorded in the nonvolatile memory 56 into the system memory 52 and then executes the program. When the digital camera 100 is activated in the LV imaging mode, the processing illustrated in FIG. 4 is started.

In step S401, the system control unit 50 starts LV image capturing via the imaging unit 22 and starts displaying a captured LV image on the display unit 28. When the system control unit 50 starts LV image capturing, it starts face detection based on the LV image via the face detection unit 24a and starts organ detection via the organ detection unit 24b in the following description, processing is performed in the LV imaging mode in which the system control unit 50 continuously performs face detection via the face detection unit 24a and organ detection via the organ detection unit 24b.

In step S402, the system control unit 50 determines whether a touch-down is performed on the touch panel 70a (display surface of the display unit 28). When a touch-down is performed (YES in step S402), the processing proceeds to step S403. On the other hand, when a touch-down is not performed (NO in step S402), the processing proceeds to step S416.

In step S403, the system control unit 50 determines whether the touch position when a touch-down is detected in step S402 (touch-down position) exists in the area corresponding to the face area detected by the face detection unit 24a. When the touch-down position exists in the area corresponding to the detected face (YES in step S403), the processing proceeds to step S405. On the other hand, when a face is not detected or when the touch-down position exists outside the area corresponding to the detected face (NO in step S403), the processing proceeds to step S404.

In step S404, the system control unit 50 sets an AF frame at the touch-down position and superimposes the set AF frame onto the LV image displayed on the display unit 28. When the AF mode (AF target specification mode) is the tracking priority AF mode in this case, the system control unit 50 performs tracking (object tracking) based on the color and luminance information by setting the subject (subject other than the face) at the touch-down position as a tracking target. In the tracking mode, a tracking starting position (initial position of the AF frame) is determined based on the touch-down position and, if the tracking target subsequently moves, the AF frame also moves following the tracking target. When the AF mode is the one-point AF mode, an AF frame is set at the touch-down position. According to the present exemplary embodiment, in the one-point AF mode, an AF frame is set based on the touch-down position and, even if a touch-move is subsequently performed, the AF frame does not move. In this mode, however, the AF frame position may be changed following the touch-move.

In step S405, the system control unit 50 determines whether the size of the face detected at the touch-down position is less than a threshold value. The threshold value of the face size may be a threshold value of the ratio of the face size to the entire LV image or a threshold value of the number of pixels occupied by the face area in the imaging unit 22 or the captured image. When the face size is equal to or larger than the threshold value (NO in step S405), it is supposed to be easy for the user to select a desired subject (face or organ) through a touch-down operation. Then, the processing proceeds to step S406. In step S406, the system control unit 50 selects (specifies) a subject based only on the touch-down position (not based on a touch-move) in the subsequent processing. This processing allows the user to select a pupil without performing a touch-move achieving a quicker operation. It is also possible that the processing in step S405 is omitted and the processing proceeds to step S407 regardless of the face size. Performing processing in this way may allow the user more correctly select a desired pupil by performing a touch-move.

In step S406, the system control unit 50 performs processing for setting an AF frame based on the touch position (the touch-down position in step S406). This processing will be described below with reference to FIG. 5.

In step S407, the system control unit 50 displays touch-move guides on the display unit 28.

FIGS. 6A to 6F illustrate examples of touch-move guides displayed on the display unit 28 in step S407.

Figure 6A:
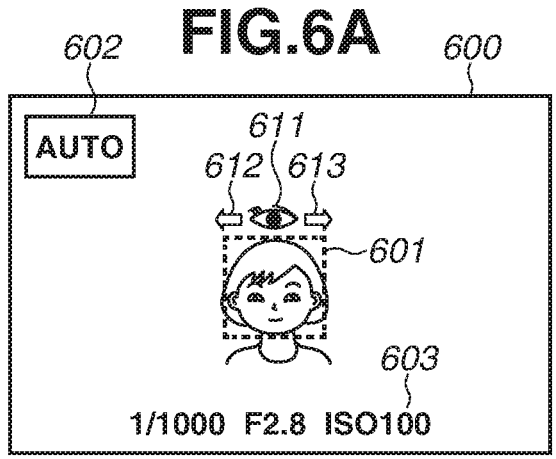
FIGS. 6A to 6F illustrate display examples of touch-move guides.

FIG. 6A illustrates an example of a first display when a face and both eyes are detected by the face detection unit 24a and the organ detection unit 24b, respectively. A face frame 601 indicating the area corresponding to the area of the detected face is superimposed on the LV image 600. In addition, an icon 602 indicating the imaging mode, and imaging setting information 603 indicating the shutter speed, aperture value, and International Organization for Standardization (ISO) speed and other current imaging settings are displayed. A pupil detection mark 611 and operation direction guides 612 and 613 are parts of touch-move guides and are displayed near the face frame 601 according to the position of the detected face. The pupil detection mark 611 indicates that pupils have been detected. Referring to FIG. 6A, the operation direction guide 612 as an arrow indicates a direction, more specifically, performing a touch-move to the left enables selecting the left side pupil toward the screen (subject person's right eye). Likewise, the operation direction guide 613 as an arrow indicates a direction, more specifically, performing a touch-move to the right enables selecting the right side pupil toward the screen (subject person's left eye). As described above, when the user performs a touch-down on the face, touch-move guides indicating selectable organ areas are displayed for respective moving directions of the touch position. It can be understood that, while viewing the touch-move guides displayed, the user is able to select a desired pupil selected by performing a touch-move to the right or left.

Figure 6B:
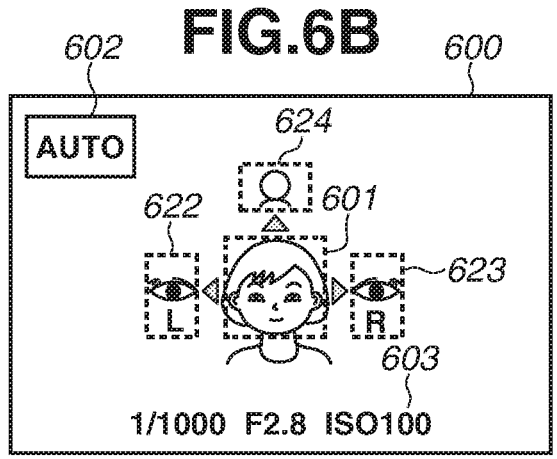

FIG. 6B illustrates an example of a second display (another example of touch-move guides) when the face and both eyes are detected by the face detection unit 24a and the organ detection unit 24b, respectively. As touch-move guides (left side pupil mark 622, right side pupil mark 623, and upper body mark 624) are displayed to the left of the face frame 601, displayed to the right of the face frame 601, and displayed above the face frame 601, respectively. Each of the left side pupil mark 622, the right side pupil mark 623, and the upper body mark 624 is supplied with a left arrow, a right arrow, and an up arrow. More specifically, for each of the left side pupil mark 622, the right side pupil mark 623, and the upper body mark 624, performing a touch-move to the left selects the left side pupil, performing a touch-move to the right selects the right side pupil, and performing an upward touch-move selects the upper body including the face. The upper body is an area larger than the area corresponding to the face.

Figure 6C:
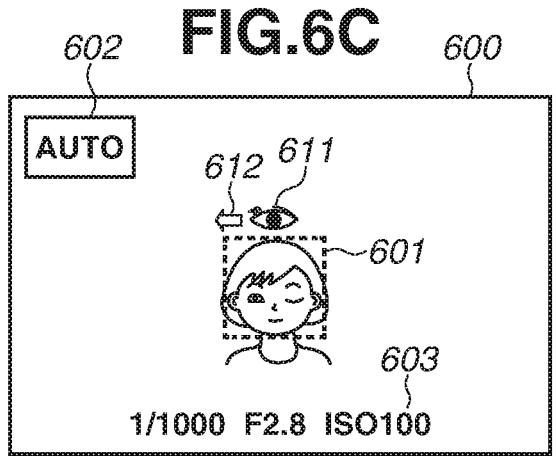

FIG. 6C illustrates an example of a first display of touch-move guides when the face and the left side eye (subject's right eye) are detected by the face detection unit 24a and the organ detection unit 24b, respectively, and the right side eye (subject's left eye) is not detected. Although, similar to FIG. 6A, the pupil detection mark 611 and the operation direction guide 612 are displayed, the operation direction guide 613 (touch-move guide to the right) is not displayed. This indicates that the right side eye is not detected for a certain reason (e.g., the right side eye is completely shut, the head is turned sideways, or an eye bandage is used) and therefore is not selectable.

Figure 6D:
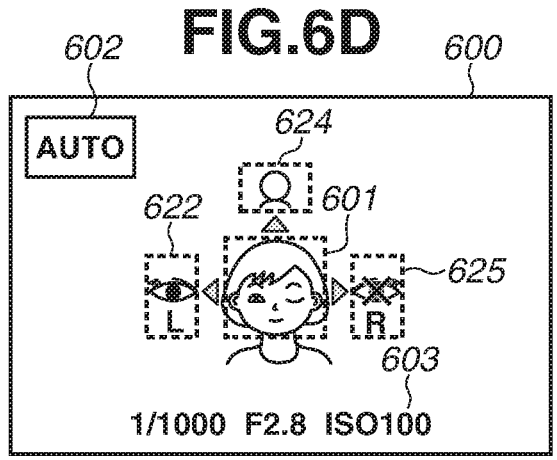

FIG. 6D illustrates an example of a second display of touch-move guides when the face and the left side eye (subject's right eye) are detected by the face detection unit 24a and the organ detection unit 24b, respectively, and the right side eye (subject's left eye) is not detected. In this case, similar to FIG. 6B, the left side pupil mark 622 and the upper body mark 624 are displayed. In addition, a no-pupil detection mark 625 is displayed on the right side instead of the right side pupil mark 623. This mark indicates that the right side eye is not detected and therefore is not selectable.

Figure 6E:
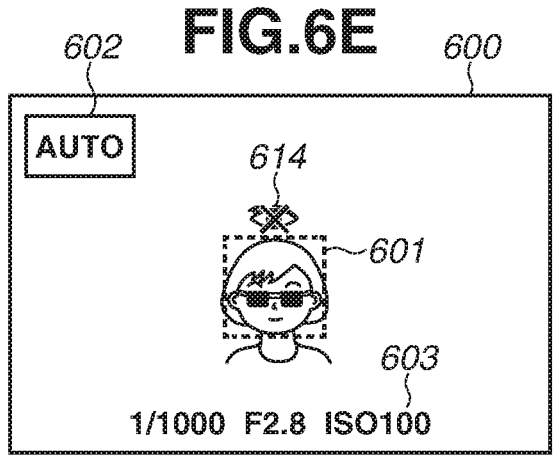

FIG. 6E illustrates examples of touch-move guides displayed when the face is detected by the face detection unit 24a, and both pupils are not detected by the organ detection unit 24b. Although the face frame 601 is displayed similar to FIG. 6A, the pupil detection mark 611 and the operation direction guides 612 and 613 are not displayed. Instead, a no-pupil detection mark 614 is displayed. This indicates that both eyes are not detected for a certain reason (e.g., both eyes are completely shut, a sunglass is worn, or the head is turned upward) and therefore are not selectable.

Figure 6F:
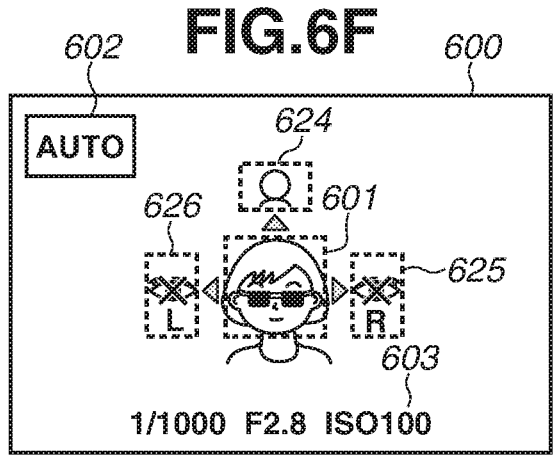

FIG. 6F illustrates an example of a second display of touch-move guides when the face is detected by the face detection unit 24a and both eyes are not detected by the organ detection unit 24b. Similar to FIG. 6B, the upper body mark 624 is displayed. Instead of the left side pupil mark 622 and the right side pupil mark 623, no-pupil detection marks 626 and 625 are displayed to the left and the right of the face, respectively. These marks indicate that both eyes are not detected and therefore are not selectable.

The present exemplary embodiment has been described above centering on examples where the touch-move guides illustrated in FIGS. 6A to 6F are displayed when a touch-down on the face area is detected. However, it is not limited thereto, and, before a touch-down is performed, touch-move guides may be displayed on each of detected faces when faces are detected.

In step S408, the system control unit 50 determines whether the touch position of the touch-down detected in step S402 has moved over a predetermined distance or longer, i.e., whether a touch-move over the predetermined distance or longer has been performed. When a touch-move is performed (YES in step S408), the processing proceeds to step S409. On the other hand, when a touch-move is not performed (NO in step S408), the processing proceeds to step S413. Also, when a flick operation is performed, the system control unit 50 determines that a touch-move has been performed because the touch position has moved with the touch maintained before a touch-up.

In step S409, the system control unit 50 determines the direction of the touch-move detected in step S408. When a touch-move to the left is performed (LEFT in step S409), the processing proceeds to step S410. When a touch-move to the right is performed (RIGHT in step S409), the processing proceeds to step S411. When a touch-move in other directions is performed (OTHER DIRECTIONS in step S409), the processing proceeds to step S412. For example, the system control unit 50 determines the direction of a touch-move based on the following method.

When the direction of the touch-move is determined based only on two directions (right and left directions), the system control unit 50 determines the direction of a touch-move in the following manner. When the touch position after performing a touch-move over a predetermined distance is on the left side of the touch-down position, the system control unit 50 determines a touch-move to the left (LEFT in step S409). Then, the processing proceeds to step S410. When the touch position after performing a touch-move over a predetermined distance is on the right side of the touch-down position, the system control unit 50 determines a touch-move to the right (RIGHT in step S409). Then, the processing proceeds to step S411. This determination can be performed only by determining the component of the X-axis direction (horizontal direction) of the touch position. In this case, since the processing does not proceed to step S412, the upper body is not selected as described above with reference to FIG. 6B.

When the direction of a touch-move is determined based on three directions (right, left, and up), the system control unit 50 determines the direction of a touch-move in the following manner. The system control unit 50 determines which is larger, the difference between the X-axis (horizontal axis) components or the difference between the Y-axis (vertical axis) components of the coordinates of the touch position after performing a touch-move over a predetermined distance and the coordinates of the touch-down position. When the difference between the X-axis components is larger than the difference between the Y-axis components, the system control unit 50 determines the movement as a horizontal movement. In this case, when the X-axis component of the touch position after performing a touch move over a predetermined distance is on the right (left) side of the touch-down position, the system control unit 50 determines a touch-move to the right (left). When the difference between the Y-axis components is larger than the difference between the X-axis components, the system control unit 50 determines the movement as a vertical movement. In this case, when the Y-axis component of the touch position after performing a touch move over a predetermined distance is on the upper (lower) side of the touch-down position, the system control unit 50 determines the movement as an upward (downward) touch-move. This determination is equivalent to determination of which of four (upper, lower, right, and left) areas, divided by 45-degree lines when viewed from the touch-down position, the touch-move has moved into. In addition, when the system control unit 50 determines the movement as a downward touch-move and no function is assigned to a downward touch-move, the system control unit 50 may determine a touch-move to the right or left based on the X-axis component. Then, the processing may proceed to step S411 or S410, respectively.

Figure 7A:
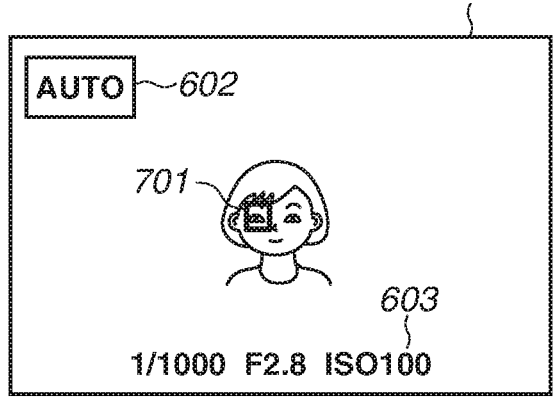
FIGS. 7A to 7D illustrate display examples of a set automatic focusing (AF) frame.

In step S410, the system control unit 50 selects the left side pupil of the face in the face area determined in step S403 and sets an AF frame at the position of the left side pupil. Then, as illustrated in FIG. 7A, the system control unit 50 superimposes an AF frame (tracking frame) 701 indicating the left side pupil onto the LV image 600. An AF frame is an index or display item for indicating a selected organ area. Even in the tracking priority AF mode or the one-point AF frame, an AF frame set after selecting a pupil tracks (follows) subsequent changes of the position of the pupil (tracking processing). More specifically, an AF frame set to a pupil also serves as a tracking frame. When the left side pupil is not detected, the system control unit 50 selects no face or no organ or selects the entire face and sets an AF frame.

Figure 7B:
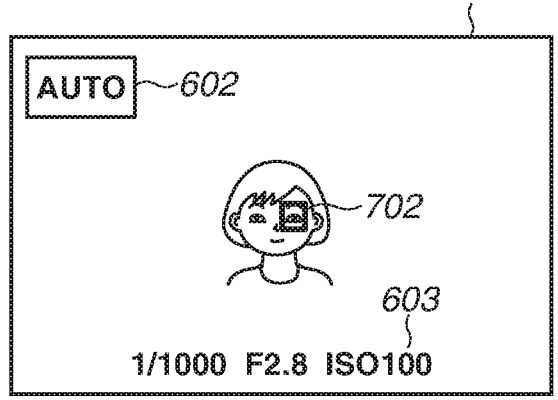

In step S411, the system control unit 50 selects the right side pupil of the face in the face area determined in step S403 and sets an AF frame at the position of the right side pupil. Then, as illustrated in FIG. 7B, the system control unit 50 superimposes an AF frame (tracking frame) 702 indicating the right side pupil onto the LV image 600. Even in the tracking priority AF mode or the one-point AF frame, the AF frame set after selecting a pupil tracks (follows) subsequent changes of the position of the pupil. In other words, an AF frame set to a pupil also serves as a tracking frame. When the right side pupil is not detected, the system control unit 50 selects no face or no organ or selects the entire face and sets an AF frame.

Figure 7C:
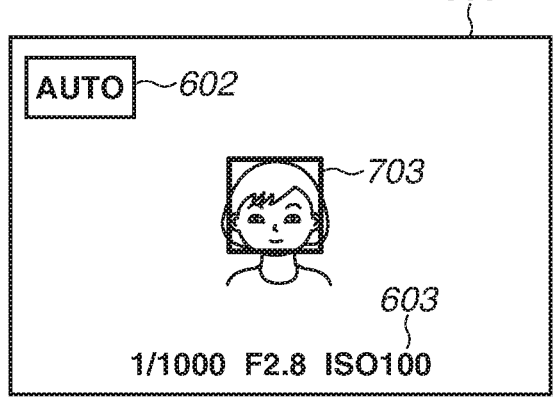
Figure 7D:
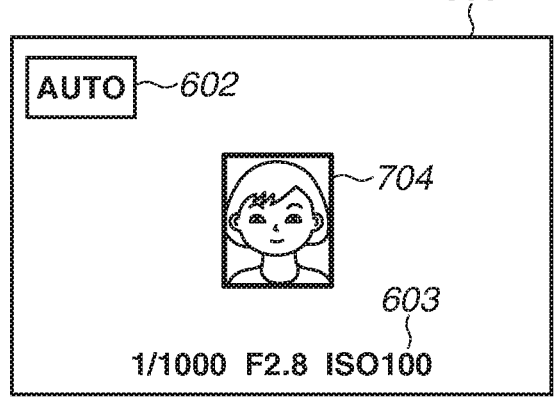

In step S412, the system control unit 50 selects a facial organ other than the eyes or an area larger than the area corresponding to the face. For example, when the system control unit 50 determines that an upward touch-move is performed when touch-move guides illustrated in FIG. 6B are displayed, the system control unit 50 selects the upper body including the face in the face area determined in step S403 and sets an AF frame at the position of the upper body. As illustrated in FIG. 7D, the system control unit 50 superimposes an AF frame (tracking frame) 704 indicating the upper body onto the LV image 600. In addition, for example, when the system control unit 50 determines that a downward touch-move is performed, the system control unit 50 may select the mouth or nose of the face in the face area determined in step S403 and sets an AF frame at the position of the mouth or nose. Alternatively, when the system control unit 50 determines that a downward touch-move is performed, the system control unit 50 may select the entire face to set an AF frame. In this case, as illustrated in FIG. 7C, the system control unit 50 displays an AF frame (tracking frame) 703 indicating the face in a superimposing manner onto the UV image 600. The AF frame set in step S412 tracks (follows) subsequent changes of the position of the subject regardless of the AF mode.

According to the present exemplary embodiment, the system control unit 50 performs the selection processing in steps S410, S411, and S412 when a touch-move over a predetermined distance is performed. In other words, the system control unit 50 performs the selection processing even if a touch-up is not performed, and a further touch-move subsequently performed does not affect the selection processing. The processing is not limited thereto, and the system control unit 50 may perform the determination in step S409 based on the moving direction from the touch-down position to a touch-up position and then perform the processing in steps S410 to S412. In addition, after performing the processing in steps S410 to S412 upon touch-move over a predetermined distance, when a further touch-move in a different direction is subsequently performed without a touch-up, the system control unit 50 may perform processing in steps S409 to S412 again to change selection.

In step S413, the system control unit 50 determines whether a touch-up is performed to release the touch for the touch-down performed in step S402. When a touch-up is performed (YES in step S413), the processing proceeds to step S414. On the other hand, when a touch-up is not performed (NO in step S413), the processing returns to step S408.

In step S414, the system control unit 50 performs processing for setting an AF frame based on the touch position (in step S414, the touch position refers to the touch-down position or touch-up position which are almost the same position because a touch-move is not detected). This processing will be described below with reference to a flowchart in FIG. 5.

In step S415, the system control unit 50 determines whether a touch-up is performed to release the touch for the touch-down performed in step S402. When a touch-up is performed (YES in step S415), the processing proceeds to step S416. On the other hand, when a touch-up is not performed (NC) in step S415), the processing repeats step S415.

In step S416, the system control unit 50 determines whether the shutter button 61 is half-pressed and SW1 is turned ON. When SW1 is turned ON (when an imaging preparation instruction is issued) (YES in step S416), the processing proceeds to step S417. On the other hand, when SW1 is not turned ON (NO in step S416), the processing proceeds to step S421.

In step S417, the system control unit 50 performs the AF processing and AE processing at the position of the AF frame set in the processing in any one of steps S404, S406, S410, S411, S412, and S414. The system control unit 50 may perform the AWB processing. The system control unit 50 may perform at least one of the AF processing, AE processing, and AWB processing not only when SW1 is turned ON but also when an AF frame is set in any one of steps S404, S406, S410, S411, S412, and S414. When the user selects the pupil in steps S410, S411, S502, or S504 (described below), the system control unit 50 performs AF so that the area of the selected pupil is focused. When the entire face (not other organs) is selected in steps S412 and S505, the system control unit 50 performs AF so that the right or left side pupil automatically selected is focused or the forehead is focused. For example, the system control unit 50 performs the automatic pupil selection in the following manner. When only one pupil is detected, the system control unit 50 selects the detected pupil. When both eyes are detected, the system control unit 50 selects the eye closer to the digital camera 100 or the eye more largely captured.

In step S418, the system control unit 50 determines whether the shutter button 61 is fully pressed and SW2 is turned ON. When SW2 is turned ON (when an imaging instruction operation is performed) (YES in step S418), the processing proceeds to step S419. On the other hand, when SW2 is not turned ON (NO in step S418), the processing proceeds to step S420.

In step S419, the system control unit 50 performs main image capturing including a series of processing ranging from main exposure and signal reading via the imaging unit 22 to captured image writing (as an image file) in the recording medium 200.

In step S420, the system control r pit 50 determines whether SW1 is kept being turned ON (a half-depression of the shutter button 61 is maintained). When the half-depression is maintained (YES in step S420), the processing proceeds to step S418. On the other hand, the half-depression is not maintained (when the depression of the shutter button 61 is canceled) (NO in step S420), the processing proceeds to step S421.

In step S421, the system control unit 50 determines whether an end event for ending the LV imaging mode is received. End events include a power off operation, a power off event due the insufficient remaining battery capacity, a transition to other operation modes such as the optical finder imaging mode and playback mode. When no end event is received (NO in step S421), the processing returns to step S402. On the other hand, when an end event is received (YES in step S421), the system control unit 50 ends the UV imaging mode processing.

The above-described position-based selection processing in steps S406 and S414 will be described in detail below with reference to FIG. 5. This processing is implemented when the system control unit 50 executes a program recorded in the nonvolatile memory 56 by using the system memory 52 as a work memory.

In step S501, the system control unit 50 determines whether the touch position by the touch-down (touch-down position) detected in step S402 is the area of the left side eye of the detected face. When the system control unit 50 determines that the touch position is the area of the left side eye (YES in step S501), the processing proceeds to step S502. On the other hand, when the system control unit 50 determines that the touch position is not the area of the left side eye (when the touch position exists outside the area of the left side eye or when the left side eye is not detected) (NO in step S501), the processing proceeds to step S503.

In step S502, similar to step S410, the system control unit 50 selects the left side pupil of the face in the face area determined in step S403 and sets an AF frame at the position of the left side pupil. Then, as illustrated in FIG. 7A, the system control unit 50 superimposes an AF frame (tracking frame) 701 indicating the left side pupil onto the LV image 600.

In step S503, the system control unit 50 determines whether the touch position by the touch-down (touch-down position) detected in step S402 is the area of the right side eye of the face detected. When the system control unit 50 determines that the touch position is the area of the right side eye (YES in step S503), the processing proceeds to step S504. On the other hand, when the system control unit 50 determines that the touch position is not the area of the right side eye (when the touch position exists outside the area of the right side eye or when the right side eye is not detected) (NO in step S503), the processing proceeds to step S505.

In step S504, similar to step S411, the system control unit 50 selects the right side pupil of the face in the face area determined in step S403 and sets an AF frame at the position of the right side pupil. Then, as illustrated in FIG. 7B, the system control unit 50 superimposes an AF frame (tracking frame) 702 indicating the right side pupil onto the LV image 600.

In step S505, based on the touch-down position, the system control unit 50 selects another organ included in the face or the entire face and sets an AF frame to the selected organ or the entire face. When an AF frame is set to the face, as illustrated in FIG. 7C, the system control unit 50 superimposes an AF frame (tracking frame) 703 indicating the face area onto the LV image 600. In step S505, since a touch-down on the areas of both eyes is not performed, the system control unit 50 may select the entire face and sets an AF frame even if the touch-down position is on the other organ. Alternatively, the system control unit 50 may select any one of detected organs such as a mouth, nose, and eyebrows at the touch-down position and then set an AF frame to a detected organ.

According to the above-described processing, if the user performs a touch-down on the desired face area and then performs a touch-move (including a flick) to the right or left, the user may select a desired pupil and then set an AF frame to the pupil (or specify the pupil as a tracking target) in step S410 or S411. This operation allows the user to specify a desired pupil with a rougher operation feeling and higher accuracy than in performing a precise touch-down aiming at the area of a pupil which is likely to be small-sized on the LV image. In other words, the user can more easily and correctly select a desired pupil of a desired face.

Figure 5:
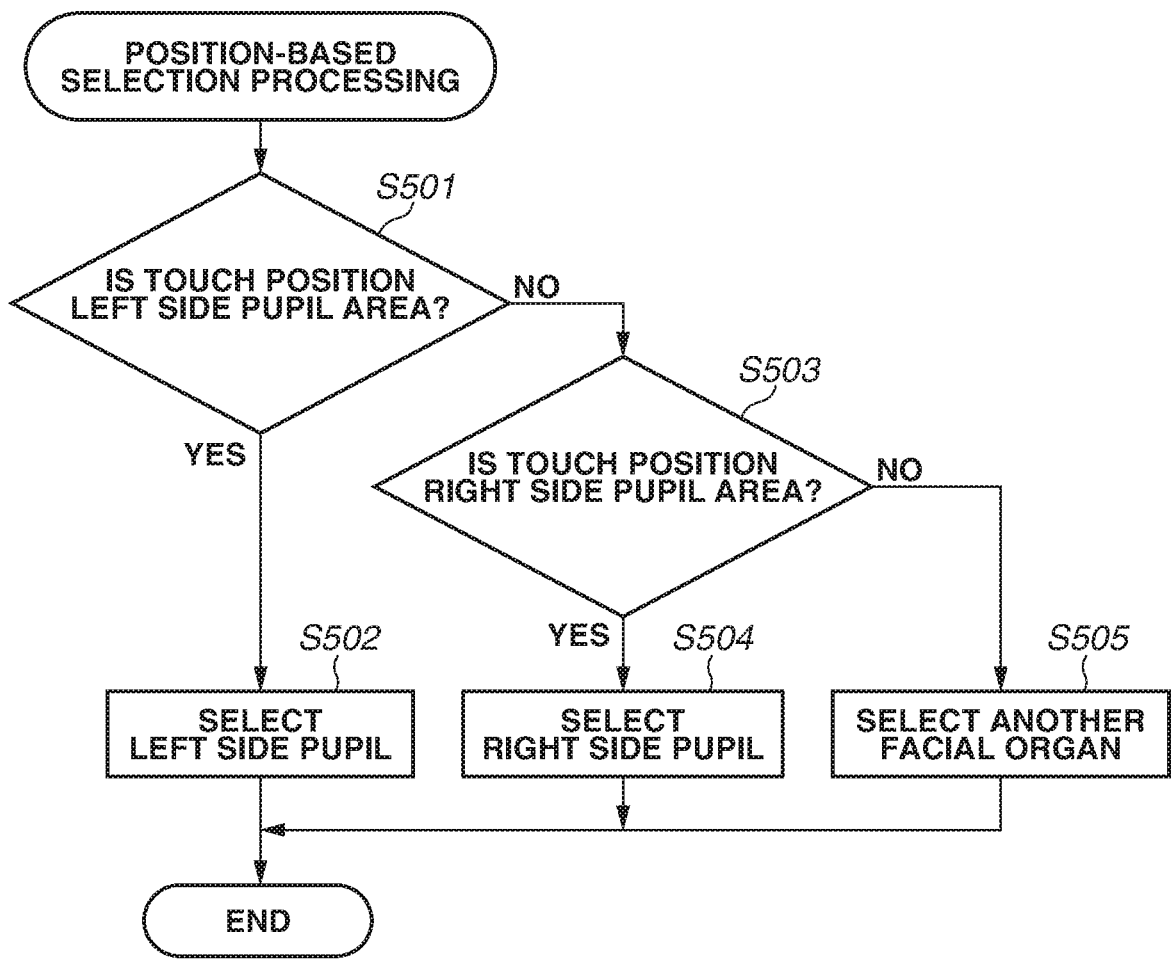
FIG. 5 is a flowchart illustrating position-based selection processing.

In the above description, when the system control unit 50 determines that a touch-up is performed (YES in step S413), the processing proceeds to step S414, and the system control unit 50 performs selection processing based on the position illustrated in FIG. 5. However, the system control unit 50 may certainly select a face and then set an AF frame without perforating the selection processing based on the position illustrated in FIG. 5.

The system control unit 50 may perform the processing illustrated in FIG. 4 in the tracking priority AF mode and may not perform the processing in the one-point AF mode. More specifically, when selecting a tracking target, the system control unit 50 allows the user to easily select a desired pupil by performing a touch-down on a face and then performing a touch-move to the right or left. On the other hand, in the one-point AF mode, the system control unit 50 may set an AF frame based only on the touch-down position without responding to a touch-move after a touch-down. In the flowchart illustrated in FIG. 4, this processing can be implemented if the processing skips step S405 and proceeds to step S406 when the touch-down position exists in the area corresponding to the detected face (YES in step S403).

Although the exemplary embodiment has been described above centering on an operation for selecting an AF or tracking target eye at the time of live view imaging, the exemplary embodiment is not limited to this example. The exemplary embodiment is also applicable as an operation for selecting facial organs detected from an image. An image is not limited to a LV image and may be a playback image. For example, the above-described exemplary embodiment is also applicable to a case where a face or facial organs (including eyes) are selected from an image recorded in a recording median and then image processing is performed on the selected face or organs. For example, in a tablet personal computer (PC), smart phone, seal printing system, and the like, it is possible to detect a face, eyes, mouth, and nose from a recorded image, select a desired eye, and apply red-eye correction, mosaic or mask, or pupil emphasis processing (e.g., enlargement) to the desired eye. It is also possible to select the nose and apply image processing such as enlargement emphasis and skin-beautifying effect to the nose. It is also possible to select the mouth and apply image processing such as redness emphasis and glossing to the mouth. As a method for selecting a facial organ in this case, there can be provided an operation method for applying the processing in steps S402 to S415 illustrated in FIG. 4 to a recorded image instead of the LV image and selecting an organ according to the direction of a touch-move out of the face on which a touch-down is performed.

The above-described various controls described to be performed by the system control unit 50 may be performed by one hardware component, or the entire apparatus may be controlled by a plurality of hardware components (e.g., a plurality of processors and circuits) which share processing.

While the above has specifically been described based on an exemplary embodiment, it is not limited thereto but can be modified in diverse ways without departing from the spirit and scope thereof. The above-described exemplary embodiment is to be considered as illustrative and not restrictive of the scope. The exemplary embodiment can be suitably combined.

Although, the above-described exemplary embodiment, is applied to the digital camera 100, it is not limited thereto. Embodiments are also applicable to an electronic apparatus capable of selecting facial organs detected from an image. More specifically, embodiments may be applicable to a PC, a personal digital assistant (PDA), a mobile phone terminal, a portable image viewer, a printer apparatus having a display, a seal printing system, a digital photo frame, a music player, a game machine, an electronic book reader, and other devices.

Also when selecting a facial organ from the LV image, embodiments are applicable not only to an imaging apparatus main body but also to an electronic apparatus (control apparatus) which communicates with an imaging apparatus (including a network camera) via wired or wireless communication to remotely control the imaging apparatus. Examples of electronic apparatuses which remotely control an imaging apparatus include a smart phone, a tablet PC, and a desktop PC. It is possible for a control apparatus to remotely control an imaging apparatus by transmitting commands for instructing the imaging apparatus to perform various operations and settings to the imaging apparatus based on operations and processing performed by the control apparatus. Embodiments are applicable to processing on the control apparatus in a case where the control apparatus can receive, via wired or wireless communication, a live view image captured by the imaging apparatus and display the live view image, and a facial organ is selected from the live view image.

According to the embodiments, it is possible to allow a user to more correctly select a desired organ area.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-200573, filed Oct. 16, 2017, which is hereby incorporated by reference herein in its entirety.

What is claimed is:

1. An electronic apparatus including at least one processor that executes one or more instructions and configures the at least one processor to perform the operations of the following units:
   a detection unit configured to detect a face and organ areas included in the face from an image;
   a touch detection unit configured to detect a touch operation on a display; and
   a control unit configured to perform control to determine, in a case where a touch is performed at a position corresponding to a face and a touch position of the touch is moved, an organ area from among a plurality of organ areas included in the face corresponding to an area where the touch is started, based on not only a position where the touch is started but also a direction where the touch position is moved, wherein the control unit performs control, in a case where a touch is started on an area corresponding to a first face detected by the detection unit from the image displayed on the display, and detecting that a touch position of the touch moves in a first direction, to select a first organ area included in the first face, and in a case where a touch is started on an area corresponding to the first face detected by the detection unit from the image displayed on the display and detecting that the touch position of the touch moves in a second direction different from the first direction, to select a second organ area included in the first face.

2. The electronic apparatus according to claim 1, wherein the control unit performs control to superimpose an index indicating the selected organ area on the image and display them.

3. The electronic apparatus according to claim 1, the control unit performs control to select, as the first organ area, the left side eye included in the first face, and to select, as the second organ area, the right side eye included in the first face.

4. The electronic apparatus according to claim 3, wherein the control unit performs control,
in a case where a touch is started on an area corresponding to a first face detected by the detection unit from the image displayed on the display, and detecting that a touch position of the touch moves in left of the first face displayed on the display, to select the left side eye included in the first face, and
in a case where a touch is started on an area corresponding to the first face detected by the detection unit from the image displayed on the display and detecting that the touch position of the touch moves in right of the first face displayed on the display, to select the right side eye included in the first face.

5. The electronic apparatus according to claim 1, wherein the control unit performs control, in a case where a touch is started on the area corresponding to the first face and then the touch is released without a movement of the touch position, to select the first face.

6. The electronic apparatus according to claim 1, wherein the control unit performs control, in a case where a touch is started on the area corresponding to the first face and then the touch is released without a movement of the touch position, to select one of a plurality of organs included in the first face based on the touch position of the touch.

7. The electronic apparatus according to claim 1, wherein the control unit performs control, in a case where a touch is started on the area corresponding to the first face, and detecting that a touch position of the touch moves a predetermined distance in a first direction, to select the first organ area even if the touch is not released.

8. The electronic apparatus according to claim 1, wherein the control unit performs control, in a case where a touch is started on the area corresponding to the first face, and detecting that a touch position of the touch moves in a third direction, to select a third organ area included in the first face.

9. The electronic apparatus according to claim 1, wherein the control unit performs control, in a case where a touch is started on the area corresponding to the first face, and detecting that a touch position of the touch moves a third direction, to select an area larger than the area corresponding to the first face including the first face.

10. The electronic apparatus according to claim 1, wherein the control unit performs control, in a case where the touch position is detected as moving a third direction, to select the first face.

11. The electronic apparatus according to claim 1, wherein the control unit performs control, in a case where a touch is detected on the area corresponding to a face and the area is larger than a predetermined size in the image displayed on the display unit, to select a face or an organ area of the face based on the touch position regardless of a direction of a subsequent movement of the touch position.

12. The electronic apparatus according to claim 1, wherein the control unit further performs control, in response to a start of a touch on the area corresponding to the first face, to display on the display unit an index indicating an organ area of the first face detected by the detection unit.

13. The electronic apparatus according to claim 1, wherein the control unit further performs control, in response to a start of a touch on the area corresponding to the first face, to display a guide indicating a selectable organ area for each moving direction of the touch position.

14. The electronic apparatus according to claim 1, wherein the at least one processor performs control to display a live view image captured by an image sensor as the image on the display.

15. The electronic apparatus according to claim 14, wherein the control unit performs control, based on an organ area selected under the control of the control unit, to perform at least one of automatic focusing processing, tracking processing, automatic exposure processing, and auto white balance processing.

16. The electronic apparatus according to claim 1, wherein the image is a recorded image and subjected to image processing based on an organ area selected under the control of the control unit.

17. The electronic apparatus according to claim 1, wherein the control unit performs control, in a case where a touch is started on the area corresponding to the first face, and then the touch position of the touch moves in the first direction, even if the touch position moves to an outside of the area corresponding to the first face, to select the first organ area included in the first face, and in a case where the touch is started on the area corresponding to the first face and then the touch position of the touch moves not in the first direction but in the second direction, even if the touch position moves to the outside of the area corresponding to the first face, to select the second organ area included in the first face.

18. A method for controlling an electronic apparatus, comprising:
detecting a face and organ areas included in the face from an image;
detecting a touch operation on a display unit;
determining, in a case where a touch is performed at a position corresponding to a face and a touch position of the touch is moved, an organ area from among a plurality of organ areas included in the face corresponding to an area where the touch is started, based on not only a position where the touch is started but also a direction where the touch position is moved; and
performing control, in a case where a touch is started on an area corresponding to a first face detected from the image displayed on the display unit, and then the touch position of the touch moves in a first direction, to select a first organ area included in the first face, and in a case where the touch is started on the area corresponding to the first face detected from the image displayed on the display unit, and then the touch position of the touch moves not in the first direction but in a second direction, to select a second organ area included in the first face.

19. A non-transitory computer-readable storage medium storing a program for causing a computer to function as each unit of the electronic apparatus according to claim 1.

* * * * *